United States Patent
Cho et al.

(10) Patent No.: US 10,031,628 B2
(45) Date of Patent: Jul. 24, 2018

(54) TOUCH SCREEN PANEL AND FABRICATION METHOD OF THE SAME

(71) Applicant: Samsung Display Co., Ltd., Yongin-si (KR)

(72) Inventors: Ki Hyun Cho, Yongin-si (KR); Jae Neung Kim, Yongin-si (KR); Cheol Kyu Kim, Yongin-si (KR); Kyung Seop Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 108 days.

(21) Appl. No.: 14/986,160

(22) Filed: Dec. 31, 2015

(65) Prior Publication Data

US 2016/0313836 A1    Oct. 27, 2016

(30) Foreign Application Priority Data

Apr. 21, 2015 (KR) .................. 10-2015-0056142

(51) Int. Cl.
*G06F 3/041* (2006.01)
*G06F 3/044* (2006.01)

(52) U.S. Cl.
CPC .............. *G06F 3/044* (2013.01); *G06F 3/041* (2013.01); *G06F 2203/04102* (2013.01); *G06F 2203/04103* (2013.01); *G06F 2203/04111* (2013.01); *G06F 2203/04112* (2013.01)

(58) Field of Classification Search
CPC combination set(s) only.
See application file for complete search history.

(56) References Cited

U.S. PATENT DOCUMENTS

| | | | |
|---|---|---|---|
| 2010/0233930 A1* | 9/2010 | Ishida | G06F 3/0412 445/24 |
| 2010/0260745 A1* | 10/2010 | Zhou | B82Y 15/00 424/130.1 |
| 2011/0205168 A1* | 8/2011 | Jun | G06F 3/044 345/173 |
| 2012/0018200 A1 | 1/2012 | Kim et al. | |
| 2014/0028584 A1 | 1/2014 | Park et al. | |
| 2014/0118292 A1 | 5/2014 | Kim | |

(Continued)

FOREIGN PATENT DOCUMENTS

| | | |
|---|---|---|
| KR | 10-2014-0055684 | 5/2014 |
| KR | 10-2014-0092683 | 7/2014 |

*Primary Examiner* — Jennifer Mehmood
*Assistant Examiner* — Sosina Abebe
(74) *Attorney, Agent, or Firm* — H.C. Park & Associates, PLC

(57) ABSTRACT

A touch screen panel includes a substrate, first and second sensing patterns, first and second pattern connecting lines, a pad portion, and lines. The first and second sensing patterns are disposed on the substrate in a sensing area and arranged in directions intersecting each other. The first pattern connecting lines are disposed in the same layer as the first sensing patterns and the second sensing patterns, and electrically connect adjacent first sensing patterns to each other. The second pattern connecting lines intersect to be insulated from the first pattern connecting lines, and electrically connect adjacent second sensing patterns to each other. The pad portion is disposed on the substrate in a peripheral area, and includes pads. The lines connect the first sensing patterns and the second sensing patterns to the pads.

10 Claims, 4 Drawing Sheets

(56) References Cited

U.S. PATENT DOCUMENTS

2014/0198266 A1    7/2014   Park et al.
2016/0147325 A1*   5/2016   Tai .......................... G06F 3/041
                                                                                              345/173
2016/0179259 A1*   6/2016   Watanabe ............. G06F 3/0412
                                                                                              345/174

* cited by examiner

TOUCH SCREEN PANEL AND FABRICATION METHOD OF THE SAME

CROSS-REFERENCE TO RELATED APPLICATION

This application claims priority from and the benefit of Korean Patent Application No. 10-2015-0056142, filed on Apr. 21, 2015, which is hereby incorporated by reference for all purposes as if fully set forth herein.

BACKGROUND

Field

Exemplary embodiments relate to a touch screen panel and a fabrication method of the same.

Discussion of the Background

In order to implement a touch screen display, a touch screen panel may be coupled to a display panel for displaying images rather than independently used. A user may input a touch on a touch screen display to provide predetermined information by pressing or touching the touch screen display panel while viewing images.

When the display panel has flexibility, the touch screen panel may also have flexibility to implement a flexible display device. There is a greater need for a flexible mobile touch screen display device for portability and other purposes.

The above information disclosed in this Background section is only for enhancement of understanding of the background of the inventive concept, and, therefore, it may contain information that does not form the prior art that is already known to a person of ordinary skill in the art.

SUMMARY

Exemplary embodiments provide a touch screen panel having flexibility.

Exemplary embodiments also provide a fabrication method of the touch screen panel.

Additional aspects will be set forth in the detailed description which follows, and, in part, will be apparent from the disclosure, or may be learned by practice of the inventive concept.

An exemplary embodiment discloses a touch screen panel, including: a substrate including a sensing area and a peripheral area; first sensing patterns and second sensing patterns disposed on a layer of the substrate in the sensing area, the first sensing patterns and the second sensing patterns being arranged in directions intersecting each other; first pattern connecting lines disposed on the layer of the substrate in the sensing area, the first pattern connecting lines electrically connecting the first sensing patterns in a first direction; second pattern connecting lines insulated from the first pattern connecting lines and intersecting the first pattern connecting lines, the second pattern connecting lines electrically connecting the second sensing patterns in a second direction intersecting the first direction; a pad portion disposed on the substrate in the peripheral area, the pad portion including pads; and lines electrically connecting the first sensing patterns to a first set of the pads and electrically connecting the second sensing patterns to a second set of the pads, respectively. The first sensing patterns, the second sensing patterns, and the first pattern connecting lines each include a first conductive layer. The pads and the lines each include a second conductive layer. The first conductive layers and the second conductive layers each include conductive nanowires, and a density of the conductive nanowire of the first conductive layer is different from a density of the conductive nanowire of the second conductive layer.

An exemplary embodiment also discloses a fabrication method of a touch screen panel, the method including: forming a first conductive layer and a second conductive layer disposed outside the first conductive layer on a transfer substrate; transferring the first conductive layer to a sensing area of a substrate and transferring the second conductive layer to a peripheral area of the substrate; patterning the first conductive layer to form, in the sensing area, first sensing patterns arranged in a first direction and second sensing patterns arranged in a second direction intersecting the first direction, first pattern connecting lines connecting the first sensing patterns in the first direction; patterning the second conductive layer to form a pad portion including pads disposed in the peripheral area and to form lines electrically connecting the first sensing patterns to a first set of the pads and electrically connecting the second sensing patterns to a second set of the pads, respectively; and forming second pattern connecting lines electrically connecting the second sensing patterns in the second direction. The first conductive layer and the second conductive layer each include conductive nanowires, and a density of the conductive nanowire of the first conductive layer is different from a density of the conductive nanowire of the second conductive layer.

An exemplary embodiment further discloses a touch screen panel, including: a substrate; first sensing patterns, first pattern connecting lines, and second sensing patterns disposed on the substrate, each of the first pattern connecting lines electrically connecting two adjacent ones of the first sensing patterns in a first direction; second pattern connecting lines insulated from the first pattern connecting lines and intersecting the first pattern connecting lines, each of the second pattern connecting lines electrically connecting two adjacent ones of the second sensing patterns in a second direction intersecting the first direction; a pad portion disposed on the substrate, the pad portion including a first pad and a second pad; a first line connecting at least one of the first sensing patterns to the first pad; and a second line connecting at least one of the second sensing patterns to the second pad. The first sensing patterns, the second sensing patterns, and the first pattern connecting lines each include a first conductive layer. The first pad, the second pad, the first line, and the second line each include a second conductive layer. The first conductive layers and the second conductive layers each include conductive nanowires, and a density of the conductive nanowire of the first conductive layer is different from a density of the conductive nanowire of the second conductive layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
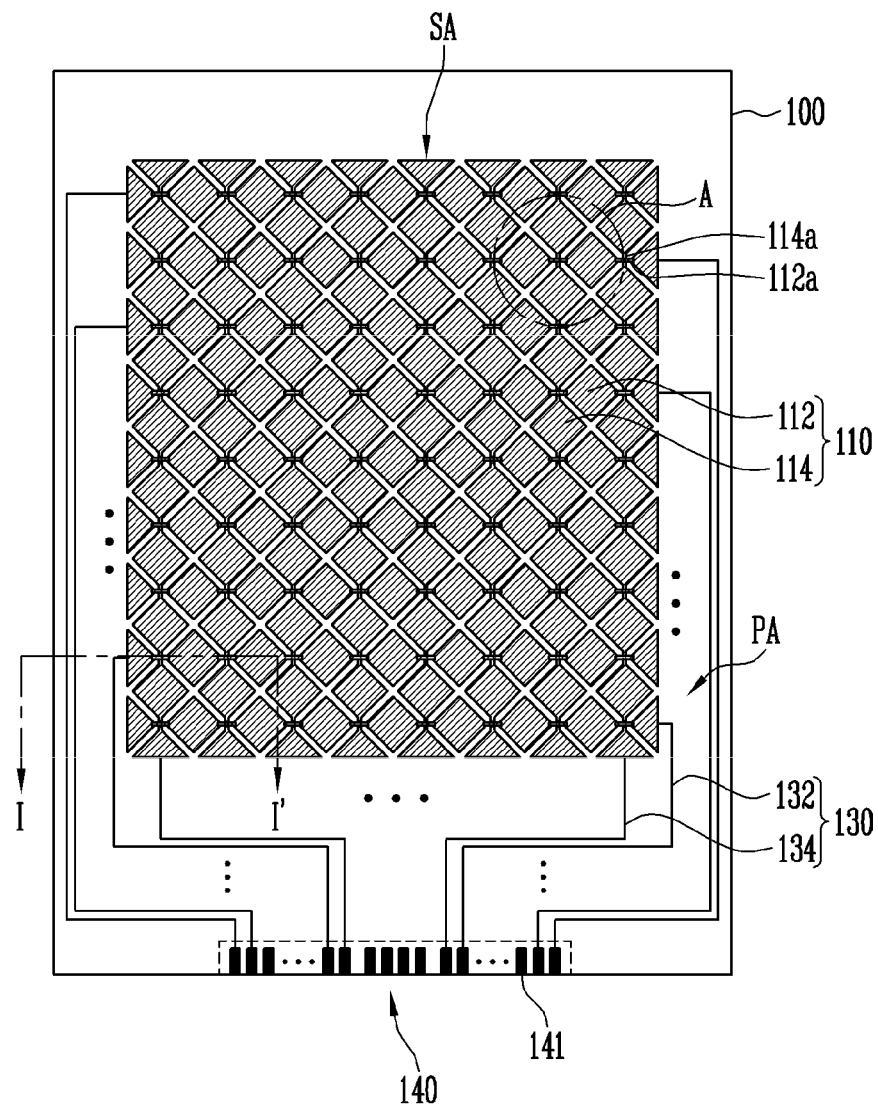
FIG. 1 is a plan view illustrating a touch screen panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
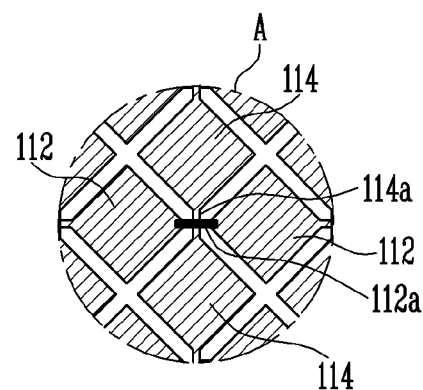
FIG. 2 is an enlarged view of area A of FIG. 1 according to an exemplary embodiment.
Figure 3:
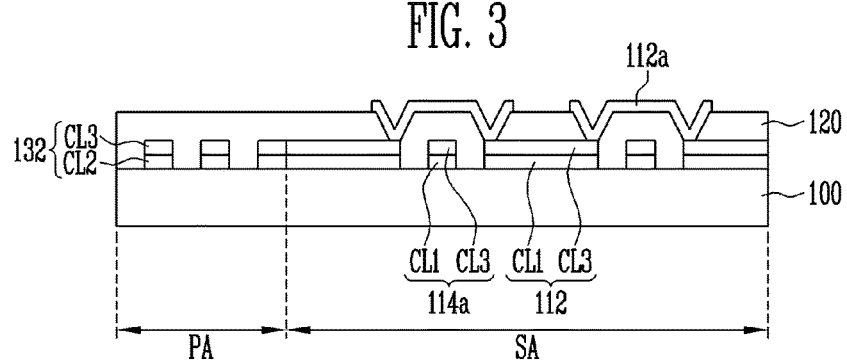
FIG. 3 is a sectional view taken along section line I-I' of FIG. 1 according to an exemplary embodiment.

FIG. 1 is a plan view illustrating a touch screen panel according to an exemplary embodiment. FIG. 2 is an enlarged view of area A of FIG. 1 according to an exemplary embodiment. FIG. 3 is a sectional view taken along section line I-I' of FIG. 1 according to an exemplary embodiment.

Referring to FIG. 1, FIG. 2, and FIG. 3, the touch screen panel may include a sensing area SA in which a user's touch position can be sensed and a peripheral area PA disposed adjacent to the sensing area SA.

The touch screen panel may include sensing electrodes 110 arranged on a substrate 100 in the sensing area SA, and lines 130 connecting the sensing electrodes 110 to a pad portion 140 disposed in the peripheral area PA.

The substrate 100 may include the sensing area SA and the peripheral area PA. The substrate 100 may be a flexible substrate. The substrate 100 may include a transparent insulating material, e.g., one of polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), triacetate cellulose (TAC), and cellulose acetate propionate (CAP).

In the sensing area SA, the sensing electrodes 110 may be arranged on the substrate 100. The sensing electrodes 110 may include first sensing patterns 114 connected to each other in one direction, and second sensing patterns 112 connected to each other in a direction intersecting the first sensing patterns 114. For example, the first sensing patterns 114 may be arranged in the longitudinal direction ("the vertical direction in FIG. 1"), and the adjacent first sensing patterns 114 may be connected to each other through a first pattern connecting line 114a. The second sensing patterns 112 may be arranged in the lateral direction ("the horizontal direction in FIG. 1"), and the adjacent second sensing patterns 112 may be connected to each other through a second pattern connecting line 112a.

One of the first and second pattern connecting lines 114a and 112a, e.g., the first pattern connecting line 114a, the first sensing patterns 114, and the second sensing patterns 112 may be arranged on the same layer, e.g., a layer on the substrate 100.

The first pattern connecting line 114a, the first sensing patterns 114, and the second sensing patterns 112 may include at least one conductive layer. For example, the first pattern connecting line 114a, the first sensing patterns 114, and the second sensing patterns 112 may include a first conductive layer CL1 disposed on the substrate 100 and a third conductive layer CL3 disposed on the first conductive layer CL1, respectively.

The first conductive layer CL1 may include a conductive nanowire. The conductive nanowire may include at least one of a silver (Ag) nanowire, a gold (Au) nanowire, a platinum (Pt) nanowire, a copper (Cu) nanowire, and a nickel (Ni) nanowire, but is not limited thereto. Further, the conductive nanowire may include an alloy of a silver (Ag) nanowire, a gold (Au) nanowire, a platinum (Pt) nanowire, a copper (Cu) nanowire, and a nickel (Ni) nanowire.

The pad portion including pads 141 and the lines 130 connecting the first sensing patterns 114 and the second sensing patterns 112 to the pads 141 may be arranged in the peripheral area PA.

The pad portion 140 may be connected to a driving circuit unit (not shown) for driving the touch screen panel.

The lines 130 may include first lines 134 respectively connecting column lines of the first sensing patterns 114 to the pads 141, and second lines 132 respectively connecting row lines of the second sensing patterns 112 to the pads 141.

The pads 141, the first lines 134, and the second lines 132 may include a second conductive layer CL2 disposed on the substrate 100 and the third conductive layer CL3 disposed on the second conductive layer CL2. The second conductive layer CL2 may include the same material as the first conductive layer CL1. For example, the second conductive layer CL2 may include a conductive nanowire. However, the density of the conductive nanowire in the second conductive layer CL2 may be greater than that of the conductive nanowire in the first conductive layer CL1. Therefore, the resistance of the second conductive layer CL2 may be lower than that the resistance of the first conductive layer CL1.

The third conductive layer CL3 may include a transparent conductive oxide. For example, the third conductive layer CL3 may include one of indium tin oxide (ITO) and indium zinc oxide (IZO). The third conductive layer CL3 may be configured to prevent or reduce a voltage drop (IR drop) of the first conductive layer CL1 and the second conductive layer CL2.

An insulating layer 120 may be disposed on the substrate 100 on which the first sensing patterns 114, the second sensing patterns 112, the first pattern connecting lines 114a, the pads 141, and the lines 130 are arranged. The insulating layer 120 may include an organic insulating material. The insulating layer 120 may expose a portion of the second sensing patterns 112. For example, the insulating layer 120 may expose an area adjacent to neighboring second sensing patterns 112 to electrically connect two adjacent ones of the second sensing patterns 112 using the second pattern connecting line 112a through the exposed area.

The second pattern connecting line 112a connecting two adjacent ones of the second sensing patterns 112 to each other may be disposed on the insulating layer 120. The second pattern connecting line 112a may intersect the first pattern connecting line 114a, but insulated from the first pattern connecting line 114a through the insulating layer 120.

The second pattern connecting line 112a may include a conductive material. For example, the second pattern connecting line 112a may include one of molybdenum (Mo), silver (Ag), titanium (Ti), aluminum (Al), copper (Cu), and an alloy thereof. Further, the second pattern connecting lines 112a may include one of indium tin oxide (ITO) and indium zinc oxide (IZO). The second pattern connecting line 112a may include a conductive polymer.

In the touch screen panel, the first sensing patterns 114, the second sensing patterns 112, the pads 141, and the lines 130, which are arranged on the substrate 100 as a flexible substrate, may all include conductive nanowires. Generally, a conductive pattern or conductive layer including the conductive nanowire has excellent flexibility as compared with that including a pure metal or alloy. Thus, the touch screen panel can have flexibility and prevent or reduce damage or disconnection of the first sensing patterns 114, the second sensing patterns 112, the pads 141, and the lines 130 due to repeated warping or bending.

Although FIG. 1 illustrates that the first sensing patterns 114, the second sensing patterns 112, and the first pattern connecting lines 114a are disposed on the same layer, aspects are not limited as such. In an exemplary embodiment, the first sensing patterns 114, the second sensing patterns 112, and the second pattern connecting lines 112a are disposed on the same layer while the first pattern connecting lines 114a is disposed on the insulating layer 120 and electrically connecting the first sensing patterns 114 through holes exposing portions of the first sensing patterns 114. Further, as shown in FIG. 1, some end patterns of the first sensing patterns 114 having substantially triangular shapes may be electrically connected to a first set of pads 141 through connecting lines 134. Some end patterns of the second sensing patterns 112 having substantially triangular shapes may be electrically connected to a second set of pads 141 through connecting lines 132.

FIG. 4, FIG. 5, FIG. 6, FIG. 7, FIG. 8, FIG. 9, and FIG. 10 are process views illustrating a fabrication method of the touch screen panel shown in FIG. 1, FIG. 2, and FIG. 3 according to an exemplary embodiment.

Figure 4:
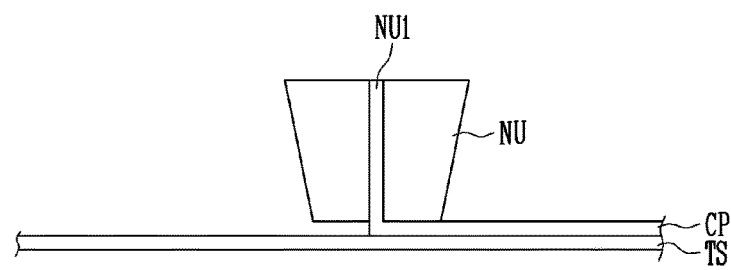
FIG. 4, FIG. 5, FIG. 6, FIG. 7, FIG. 8, FIG. 9, and FIG. 10 are process views illustrating a fabrication method of the touch screen panel shown in FIG. 1, FIG. 2, and FIG. 3 according to an exemplary embodiment.
Figure 5:
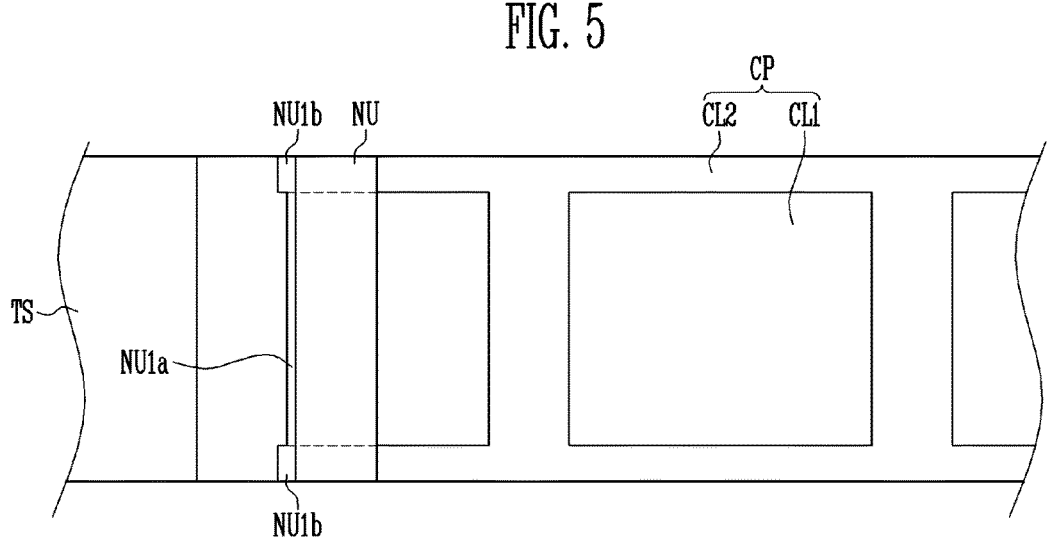

FIG. 4 is a sectional view illustrating a process of forming a conductive pattern on a transfer substrate according to an exemplary embodiment. FIG. 5 is a plan view of FIG. 4 according to an exemplary embodiment.

Referring to FIG. 4 and FIG. 5, a conductive material is coated on a transfer substrate TS, thereby forming a conductive layer CP. The conductive material may include a conductive nanowire. The conductive layer CP may include a first conductive layer CL1 disposed on the transfer substrate TS and a second conductive layer CL2 disposed outside the first conductive layer CL1. Here, the density of the conductive nanowire in the first conductive layer CL1 may be different from the density of the conductive nanowire in the second conductive layer CL2. The conductive nanowire of the second conductive layer C2 may include at least one of a silver (Ag) nanowire, gold (Au) nanowire, platinum (Pt) nanowire, copper (Cu) nanowire, and nickel (Ni) nanowire, but may have different material in comparison with the conductive nanowire in the first conductive layer CL1 such that the density of the conductive nanowire in the first conductive layer CL2 is greater than the density of the conductive nanowire in the first conductive layer CL1. Further, the conductive nanowire of the second conductive layer C2 may include an alloy of a silver (Ag) nanowire, gold (Au) nanowire, platinum (Pt) nanowire, copper (Cu) nanowire, and nickel (Ni) nanowire. Further, the conductive nanowire of the second conductive layer C1 and the conductive nanowire of the second conductive layer C2 may include the same material but may have different resistance by the process described with reference to FIG. 4 and FIG. 5.

The first conductive layer CL1 and the second conductive layer CL2 may be formed by using a nozzle unit NU disposed on the transfer substrate TS. The nozzle unit NU may include nozzles NU1. For example, the nozzle unit NU may include a first nozzle NU1a and second nozzles NU1b respectively disposed both sides of the first nozzle NU1a, the second nozzles NU1b having an opening area different from an opening area of the first nozzle NU1a. The opening area of the second nozzles NU1b may be greater than that the opening area of the first nozzle NU1a. Therefore, the amount of the conductive nanowire discharged from the second nozzles NU1b and deposited per unit area may be greater than the amount of the conductive nanowire discharged from the first nozzle NU1a and deposited per unit area. The density of the conductive nanowire deposited by the second nozzles NU1b may be greater than the density of the conductive nanowire deposited by the first nozzle NU1a.

The transfer speed of the transfer substrate TS may be changed at every predetermined period. For example, the transfer substrate TS may be transferred at a first speed during a first period. The transfer substrate TS may be transferred at a second speed different from the first speed during a second period shorter than the first period. Here, the second speed may be slower than the first speed. When the transfer speed of the transfer substrate TS is the second speed, the amount of the conductive nanowire per unit area, which is deposited on the transfer substrate TS, may be greater than the amount of the conductive nanowire per unit area, which is deposited on the transfer substrate TS at the first speed. Further, the density of the conductive nanowire deposited on the transfer substrate TS at the second speed may be greater than the density of the conductive nanowire deposited on the transfer substrate TS at the first speed.

The first conductive layer CL1 may be a conductive layer formed by depositing the conductive nanowire discharged by the first nozzle NU1a at the first speed. The second conductive layer CL2 may include a conductive layer formed by depositing the conductive nanowire discharged by the second nozzles NU1b and a conductive layer formed by depositing the conductive nanowire discharged by the first nozzle NU1a and the second nozzles NU1b at the second speed (see e.g., FIG. 5).

Hence, the density of the conductive nanowire of the second conductive layer CL2 may be greater than that the density of the conductive nanowire of the first conductive layer CL1. Therefore, the resistance of the second conductive layer CL2 may be lower than the resistance of the first conductive layer CL1.

Figure 6:
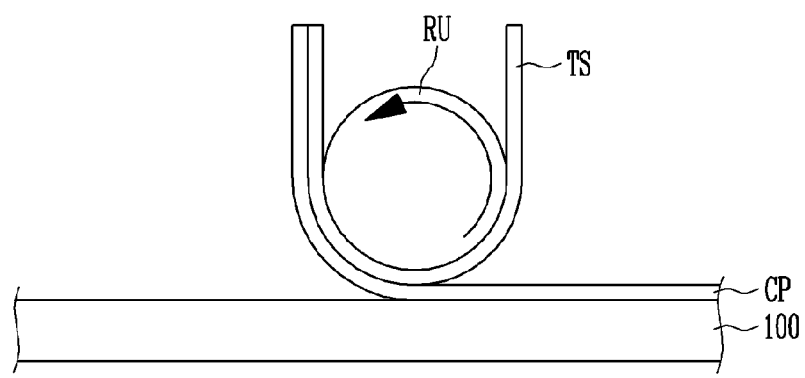

FIG. 6 is a sectional view illustrating a process of transferring the first and second conductive layers onto the transfer substrate.

Referring to FIG. 6, after the conductive layer CP is formed on the transfer substrate TS, the first conductive layer CL1 and the second conductive layer CL2 are transferred onto a substrate 100 including a sensing area SA and a peripheral area PA. Here, the first conductive layer CL1 may be transferred to the sensing area SA, and the second conductive layer CL2 may be transferred to the peripheral area PA.

The transfer of the conductive layer CP may be performed using a roll-to-roll technique.

More specifically, the transfer substrate TS having the conductive layer CP formed thereon is supplied to a transfer roll RU. Here, the conductive layer CP may be disposed opposite to the substrate 100.

The transfer roll RU may apply pressure to the transfer substrate TS in the direction of the substrate 100 while rotating. Therefore, the conductive layer CP on the transfer substrate TS may be transferred onto the substrate 100.

Figure 7:
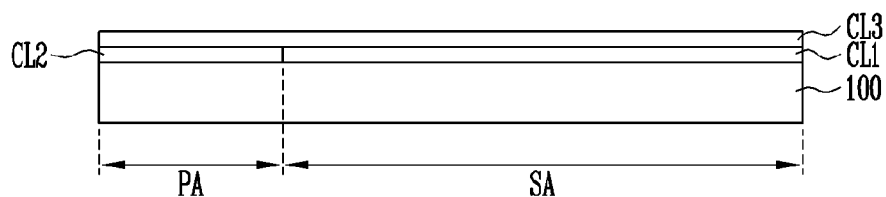

FIG. 7 is a sectional view illustrating a process of forming a third conductive layer on the first and second conductive layers.

Referring to FIG. 7, after the conductive layer CP including the first conductive layer CL1 and the second conductive layer CL2 is transferred onto the substrate 100, a third conductive layer CL3 is disposed on the conductive layer CP on the substrate 100.

The third conductive layer CL3 may include a transparent conductive oxide. For example, the third conductive layer CL3 may include one of indium tin oxide (ITO) and indium zinc oxide (IZO). The third conductive layer CL3 may be configured to prevent or reduce a voltage drop (IR drop) of the first conductive layer CL1 and the second conductive layer CL2.

Figure 8:
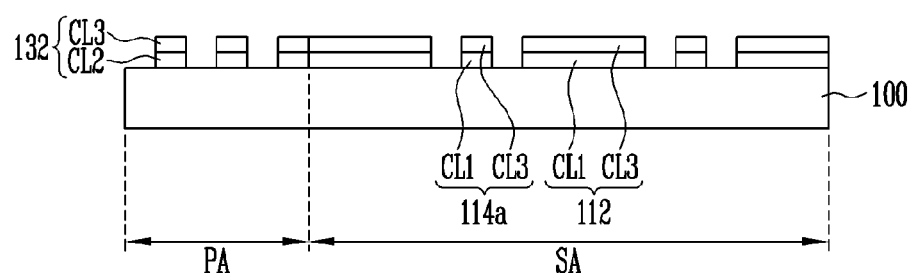

FIG. 8 is a sectional view illustrating a process of patterning the first conductive layer, the second conductive layer, and the third conductive layer.

Referring to FIG. 8, after the third conductive layer CL3 is disposed, the first conductive layer CL1, the second conductive layer CL2, and the third conductive layer CL3 may be patterned. The patterning may be performed through a wet etching process, and the first conductive layer CL1, the second conductive layer CL2, and the third conductive layer CL3 may be etched at the same time.

By performing the patterning, first sensing patterns 114 arranged in one direction, second sensing patterns 112 arranged in a direction intersecting the first sensing patterns 114, and first pattern connecting lines 114a connecting two adjacent ones of the first sensing patterns 114 are formed in the sensing area SA. Therefore, the first sensing patterns 114, the second sensing patterns 112, and the first pattern connecting lines 114a may include the first conductive layer CL1 disposed on the substrate 100 and the third conductive layer CL3 disposed on the first conductive layer CL1.

Further, by performing the patterning, a pad portion 140 including pads 141, first lines 134 connecting the first sensing patterns 114 to the pad portion 140, and second lines 132 connecting the second sensing patterns 112 to the pad portion 140 are formed in the peripheral area PA.

Therefore, the pads 141, the first lines 134, and the second lines 132 may include the second conductive layer CL2 disposed on the substrate 100 and the third conductive layer CL3 disposed on the second conductive layer CL2.

Figure 9:
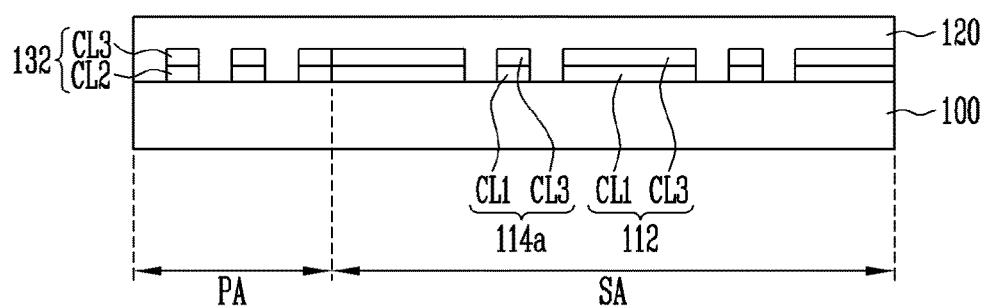

FIG. 9 is a sectional view illustrating a process of forming an insulating layer.

Referring to FIG. 9, after the first conductive layer CL1, the second conductive layer CL2, and the third conductive layer CL3 are patterned, an insulating layer 120 may be disposed to cover the first sensing patterns 114, the second sensing patterns 112, the first pattern connecting lines 114a, the pad portions 140, the first lines 134, and the second lines 132. The insulating layer 120 may include an organic insulating material through which light can be transmitted. For example, the insulating layer 120 may be formed through spin coating.

Figure 10:
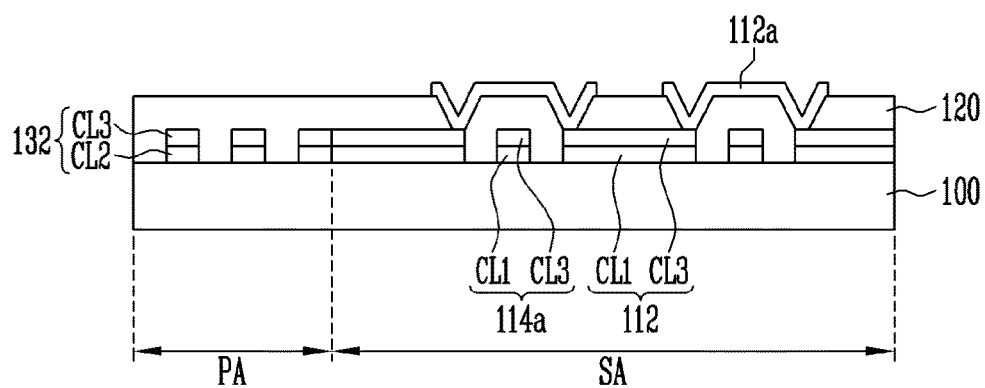

FIG. 10 is a sectional view illustrating a process of forming second pattern connecting lines.

Referring to FIG. 10, after the insulating layer 120 is disposed, the insulating layer 120 may be patterned. As the insulating layer 120 is patterned, a portion of the second sensing patterns 112 may be exposed. For example, the insulating layer 120 may expose an area adjacent to neighboring second sensing patterns 112 of each second sensing pattern 112. More specifically, a second sensing pattern 112 may electrically connected to one or more, e.g., two neighboring second patterns 112 through the second pattern connecting lines 112a. Since the insulating layer 120 is patterned to have openings through which the second pattern connecting lines 112a contacts the exposed portions of the second sensing patterns 112 (see e.g., FIG. 10).

After the insulating layer 120 is patterned, second pattern connecting lines 112a electrically connecting the adjacent second sensing patterns 112 to each other are formed on the insulating layer 120. The second pattern connecting lines 112a may be formed by forming a conductive layer on the insulating layer 120 and patterning the conductive layer. The conductive layer may include one of molybdenum (Mo), silver (Ag), titanium (Ti), aluminum (Al), copper (Cu), and alloy thereof. The conductive layer may include one of indium tin oxide (ITO) and indium zinc oxide (IZO). The conductive layer may also include a conductive polymer.

In the method described above, the first sensing patterns 114, the second sensing patterns 112, the pads 141, and the lines 130 may be formed at the same time. By using one mask to form the patterns simultaneously, the number of patterning processes can be reduced. A general patterning process may be performed through a photolithography process. The photolithography process may be performed by repeatedly using an exposure and development process, which results in environmental pollution. By reducing the number of patterning processes would reduce the manufacturing costs as wells as environmentally harmful effects.

As described above, the touch screen panel uses a flexible substrate, and conductive patterns disposed on the substrate include conductive nanowires. Thus, the touch screen panel can have flexibility and prevent (or reduce) damage of the conductive patterns due to repeated warping or bending.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch screen panel, comprising:
   a substrate comprising a sensing area and a peripheral area;
   first sensing patterns and second sensing patterns disposed on a layer of the substrate in the sensing area, the first sensing patterns and the second sensing patterns being arranged in directions intersecting each other;
   first pattern connecting lines disposed on the layer of the substrate in the sensing area, the first pattern connecting lines electrically connecting the first sensing patterns in a first direction;
   second pattern connecting lines insulated from the first pattern connecting lines and intersecting the first pattern connecting lines, the second pattern connecting lines electrically connecting the second sensing patterns in a second direction intersecting the first direction;
   a pad portion disposed on the substrate in the peripheral area, the pad portion comprising pads; and
   lines electrically connecting the first sensing patterns to a first set of the pads and electrically connecting the second sensing patterns to a second set of the pads, respectively,
   wherein the first sensing patterns, the second sensing patterns, and the first pattern connecting lines each comprise a first conductive layer,
   wherein the pads and the lines each comprise a second conductive layer, and
   wherein the first conductive layers and the second conductive layers each comprise conductive nanowires, and a density of the conductive nanowire of the first conductive layer is different from a density of the conductive nanowire of the second conductive layer.

2. The touch screen panel of claim 1, wherein the density of the conductive nanowire of the second conductive layer is greater than the density of the conductive nanowire of the first conductive layer.

3. The touch screen panel of claim 2, wherein resistance of the second conductive layer is lower than resistance of the first conductive layer.

4. The touch screen panel of claim 1, wherein the conductive nanowire of the second conductive layer comprises at least one of a silver (Ag) nanowire, a gold (Au) nanowire, a platinum (Pt) nanowire, a copper (Cu) nanowire, a nickel (Ni) nanowire, and an alloy of the silver (Ag) nanowire, the gold (Au) nanowire, the platinum (Pt) nanowire, the copper (Cu) nanowire, and the nickel (Ni) nanowire.

5. The touch screen panel of claim 1, further comprising a third conductive layer disposed on the first conductive layer and the second conductive layer.

6. The touch screen panel of claim 5, wherein the third conductive layer comprises a transparent conductive oxide.

7. A touch screen panel, comprising:
   a substrate;
   first sensing patterns, first pattern connecting lines, and second sensing patterns disposed on the substrate, each of the first pattern connecting lines electrically connecting two adjacent ones of the first sensing patterns in a first direction;
   second pattern connecting lines insulated from the first pattern connecting lines and intersecting the first pattern connecting lines, each of the second pattern connecting lines electrically connecting two adjacent ones of the second sensing patterns in a second direction intersecting the first direction;
   a pad portion disposed on the substrate, the pad portion comprising a first pad and a second pad;
   a first line connecting at least one of the first sensing patterns to the first pad; and
   a second line connecting at least one of the second sensing patterns to the second pad,
   wherein the first sensing patterns, the second sensing patterns, and the first pattern connecting lines each comprise a first conductive layer,
   wherein the first pad, the second pad, the first line, and the second line each comprise a second conductive layer, and
   wherein the first conductive layers and the second conductive layers each comprise conductive nanowires, and a density of the conductive nanowire of the first conductive layer is different from a density of the conductive nanowire of the second conductive layer.

8. The touch screen panel of claim 7, wherein the density of the conductive nanowire of the second conductive layer is greater than the density of the conductive nanowire of the first conductive layer, and wherein resistance of the second conductive layer is lower than resistance of the first conductive layer.

9. The touch screen panel of claim 7, wherein the conductive nanowire of the second conductive layer comprises at least one of a silver (Ag) nanowire, a gold (Au) nanowire, a platinum (Pt) nanowire, a copper (Cu) nanowire, a nickel (Ni) nanowire, and an alloy of the silver (Ag) nanowire, the gold (Au) nanowire, the platinum (Pt) nanowire, the copper (Cu) nanowire, and the nickel (Ni) nanowire.

10. The touch screen panel of claim 7, further comprising a third conductive layer disposed on the first conductive layers and the second conductive layers, wherein the substrate is a flexible substrate.

* * * * *